United States Patent [19]

Bohn

[11] Patent Number: 5,735,542
[45] Date of Patent: Apr. 7, 1998

[54] AIRBAG HOUSING

[75] Inventor: Stefan Bohn, Goldbach, Germany

[73] Assignee: MST Automotive GmbH, Aschaffenburg, Germany

[21] Appl. No.: 729,560

[22] Filed: Oct. 11, 1996

[30] Foreign Application Priority Data

Oct. 19, 1995 [DE] Germany ............. 195 38 871.2

[51] Int. Cl.⁶ ........................................... B60R 21/16
[52] U.S. Cl. .................................. 280/728.2; 280/732
[58] Field of Search ..................... 280/728.1, 728.2, 280/728.3, 731, 732

[56] References Cited

U.S. PATENT DOCUMENTS

| | | | |
|---|---|---|---|
| 4,941,678 | 7/1990 | Lauritzen et al. | |
| 5,261,693 | 11/1993 | Krickl et al. | 280/732 |
| 5,263,739 | 11/1993 | Webber et al. | 280/732 |
| 5,387,009 | 2/1995 | Lauritzen et al. | 280/741 |
| 5,484,165 | 1/1996 | Jenkins et al. | 280/732 |
| 5,490,689 | 2/1996 | Garner et al. | 280/732 |

FOREIGN PATENT DOCUMENTS 4340999  6/1995  Germany.

*Primary Examiner*—Paul N. Dickson
*Attorney, Agent, or Firm*—Sprung Kramer Schaefer & Briscoe

[57] ABSTRACT

A housing for a passenger protection device in a motor vehicle having an airbag and a gas generator therein and a protective covering thereon to form a ready to install module. The housing comprises a body having an essentially U-shaped cross section which is uniform lengthwise along an axis. The housing also has two mainly flat end covers and tension members for simultaneously fastening the airbag and the protective covering to the housing.

25 Claims, 4 Drawing Sheets

5,735,542

AIRBAG HOUSING

BACKGROUND OF THE INVENTION

The invention relates to a housing to accommodate a gas generator and an airbag for a passenger protection system in a motor vehicle, which, together with the gas generator, the airbag and in some cases a protective covering, a lid and fastening means, forms a module ready for installation.

SUMMARY OF THE INVENTION

To an increasing extent, automobile manufacturers are offering airbags for the passenger as extra equipment, or even as standard equipment. Their aim is to manufacture such airbag modules as inexpensively as possible in order to be able to offer the customer the additional safety at the lowest possible cost. All elements of the airbag module are critically analyzed and examined for possible cost savings. In the case of a housing, savings can be achieved especially by not only adapting it to the existing, sometimes narrow and angular installation conditions, but vice-versa by configuring the areas of the motor vehicle body, especially the instrument panel, for the installation of an airbag. In this manner the possibility is created for designing a single housing for a plurality of applications and for exploiting the manufacturing advantages for the production of large numbers of units.

The invention is addressed to the problem of proposing a housing of the kind referred to above, which will be simple and cheap to manufacture while taking into consideration the criteria given above, and which will be as light as possible without the need to accept functional disadvantages.

For the solution of this problem, it is proposed according to the invention that the housing be composed of a substantially U-shaped body and two mainly flat end covers, the body having a uniform cross section along its length, the end covers being connected to the body by tension means disposed in the direction of the axis of the base, and the tension means serving simultaneously for fastening the airbag and, in some cases, a protective covering or a lid.

To manufacture the body for such housings it is best to start out with a specially shaped stock material from which sections are separated by cuts made perpendicular to its long axis.

The body can be made from a sheet-metal stock or an extruded stock. In all cases the starting product is a comparatively simple and very easily made cross-sectional profile which, of course, is suited to the requirements of an airbag housing.

If one starts with a sheet-metal stock, the latter can be produced somewhat similarly to a roof gutter, i.e., with a U-shaped cross section with a semicircular bottom. The upper edges are best rolled outwardly and each of the vertical walls has semicircular indentations at a distance from the rolled edge but above the transition into the semicircular bottom.

The indentations are of such dimensions that the tension means placed in them will be approximately flush with the exterior of the side walls.

In such a body consisting of a stock material, the corresponding end covers are advantageously made of flat sheet-metal parts matched to the cross section of the base, and their margins are bent at approximately right angles to overlap the body. In one advantageous embodiment, the end covers have, in a known manner, the openings required for the installation of the generator, and four marginal bores to receive tension means in the form of tension rods provided with threaded ends. For the fastening of the airbag and/or the protective coverings to the housing, it is expedient to use sections of the material of the airbag or protective covering which can be slung around the tension rods and clamped between the tension rods and the base.

In another embodiment, the stock material again has a U-shaped cross section with a semicircular bottom, but the upper edges are folded outward to a greater width forming a doubled margin and the vertical walls are offset outwardly over about half their length, and in the area of the doubled margin, openings running longitudinally are provided. For this embodiment the tension means consist of two internal stringers of a substantially T-shaped cross section running over the entire length of the body, two external channel-shaped sections also extending over the entire length of the body and provided with openings corresponding to those in the body, plus two tension anchors which can be passed through the end covers. At the same time the base of the T-shaped stringers has a longitudinal slot to accommodate the tension rod and extends longitudinally only over the areas in which openings are provided in the body in the doubled margin. Sections of the material of the airbag and/or covering can be gripped over the entire length of the body by the tension armature between the outside U-shaped stringer and the body. In this case the inside T-shaped stringer can consist of a bent sheet metal blank in which the base limb is of a double-walled U shape and the areas of the base limb which do not correspond to the openings in the body are cut out. The outside U-shaped stringer can also consist of a bent sheet metal blank in which the openings are punched.

In a further embodiment, provision is made: for the extruded stock material to have a substantially U-shaped cross section with a semicircular bottom; for an intermediate wall to be provided, roofing over the bottom area approximately semicircularly and provided with openings; for the vertical sides to have a step-like, half-height offset, and for the ends of the U-shaped cross section to form outwardly facing, closed annular chambers in the walls of which inside openings extending longitudinally are provided. In this case the tension means consist of two inside, T-shaped stringers and two tension anchors, the base portion of the stringer having a longitudinal bore to receive the tension armature and extending longitudinally only over the areas in which openings are provided in the wall of the annular chamber.

Alternatively, in the body consisting of an extruded blank, the vertical walls have sections protruding outward at right angles approximately at one-half their height, which form closed, elongated annular chambers lying above these sections, in the walls of which openings extending lengthwise are provided. In this case the tension means consist of two external, T-shaped stringers and two tension anchors, the base part of the stringer having a longitudinal bore to receive the tension anchor and extending longitudinally only over the areas in which openings are provided in the wall of the annular chamber. In the two last-mentioned embodiments, sections the material of the airbag and lid can be clamped together between the T-shaped stem and the upper area of the body. Another advantageous variant of the invention is that the clamped portion of the material of the lid has an inside or outside dog-leg cross section by means of which the doubled material of the base portion or of the T-shaped stringer can be positively gripped.

Furthermore, provision is made such that the T-shaped stringers can consist of an extruded stock material. Instead

3 of the two tension anchors running all the way through, four bolts with self-tapping threads can be provided. A further simplification can be that the T-shaped stringers are made integral with one of the end covers. Lastly, it is expedient for the end covers have means for fastening the module in an instrument panel or in a vehicle body.

Thus a variety of embodiments of the fundamental idea of the invention have been described, which satisfy all of the requirements stated in the beginning. The body parts consist in each case of sections cut from a stock material that can be made in great lengths and hence economically, and their cross-sectional shape can be adapted to the requirements in many different ways. Together with the end covers and the tension means running lengthwise of the body, housings consisting of few component parts, which can be assembled by the tension means with the airbag, the gas generator and, if desired, a protective covering or a lid, to form an airbag module. It is seen to be especially advantageous that the tension means were able to be reduced to four tension anchors or four bolts, and that no further fastening means are necessary for fastening the airbag, the protective cover and the lid. If additional mounting hardware is needed for fastening the airbag module to the body of the vehicle, it can also be fastened to the airbag module with the tension means.

Additional details will be given with the aid of the embodiments represented in FIGS. 1–5.

DETAILED DESCRIPTION OF THE PREFERRED EMBODIMENTS

Figure 1:
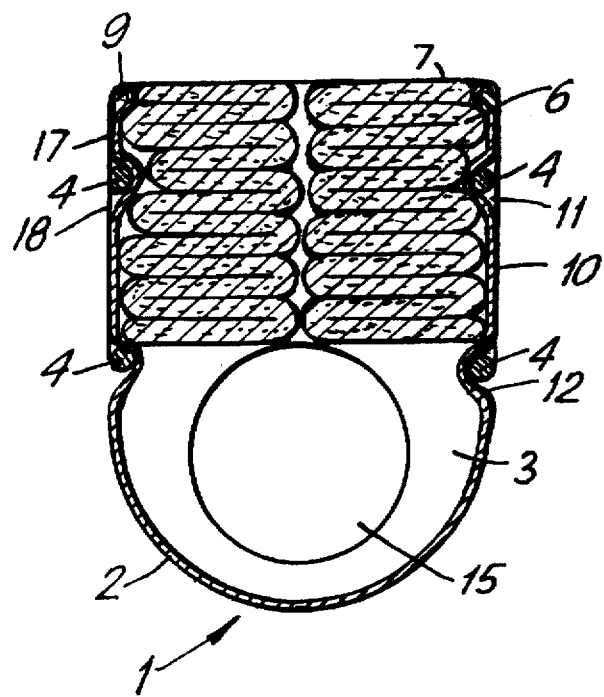
FIG. 1 shows a first embodiment in section

FIG. 1 shows a housing 1 for an airbag module in which the base member 2 consists of a section made by cutting through a sheet-metal blank perpendicularly to its length. The cross-sectional shape is essentially U-shaped with a semicircular-shaped bottom portion and with sides 10 which are rolled outwardly at the top edges 9. Furthermore, two indentations 11, 12 are provided in the sides 10, and they are of approximately semicircular shape and serve to receive the tension means, consisting of tension rods 4, when the airbag module is in place. The end cover 3 has an opening 15 to accommodate a gas generator. Above this opening the airbag 6 is folded and provided with a protective covering 7. Both the airbag and the protective covering are provided with sections 17, 18 of material which can be slung around the tension rods 4.

Figure 2:
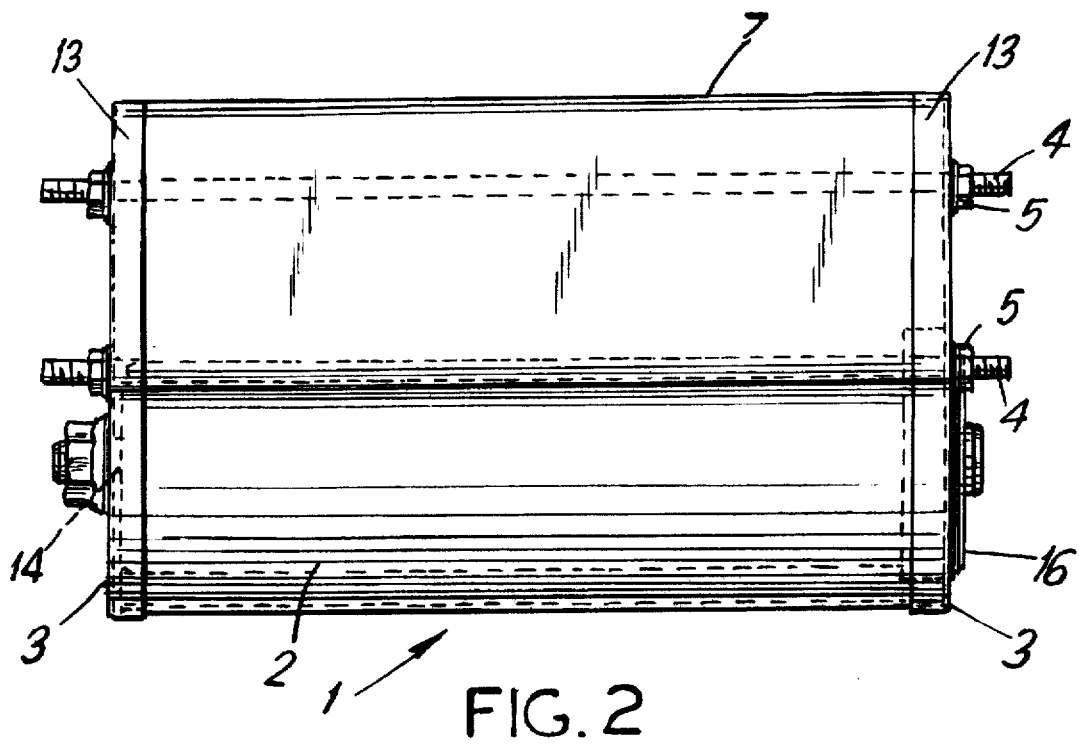
FIG. 2 the first embodiment in a side view

It can be seen from the side view of this housing 1 in FIG. 2 how the end covers 3 have margins 13 bent away at right angles to overlap the body member 2. In the left end cover 3 an opening 14 is provided which serves for the fastening of the gas generator 16. The tension means consist in this case of the tension rods 4 which have threaded ends and the nuts 5 which are threaded onto the tension rods.

Figure 3:
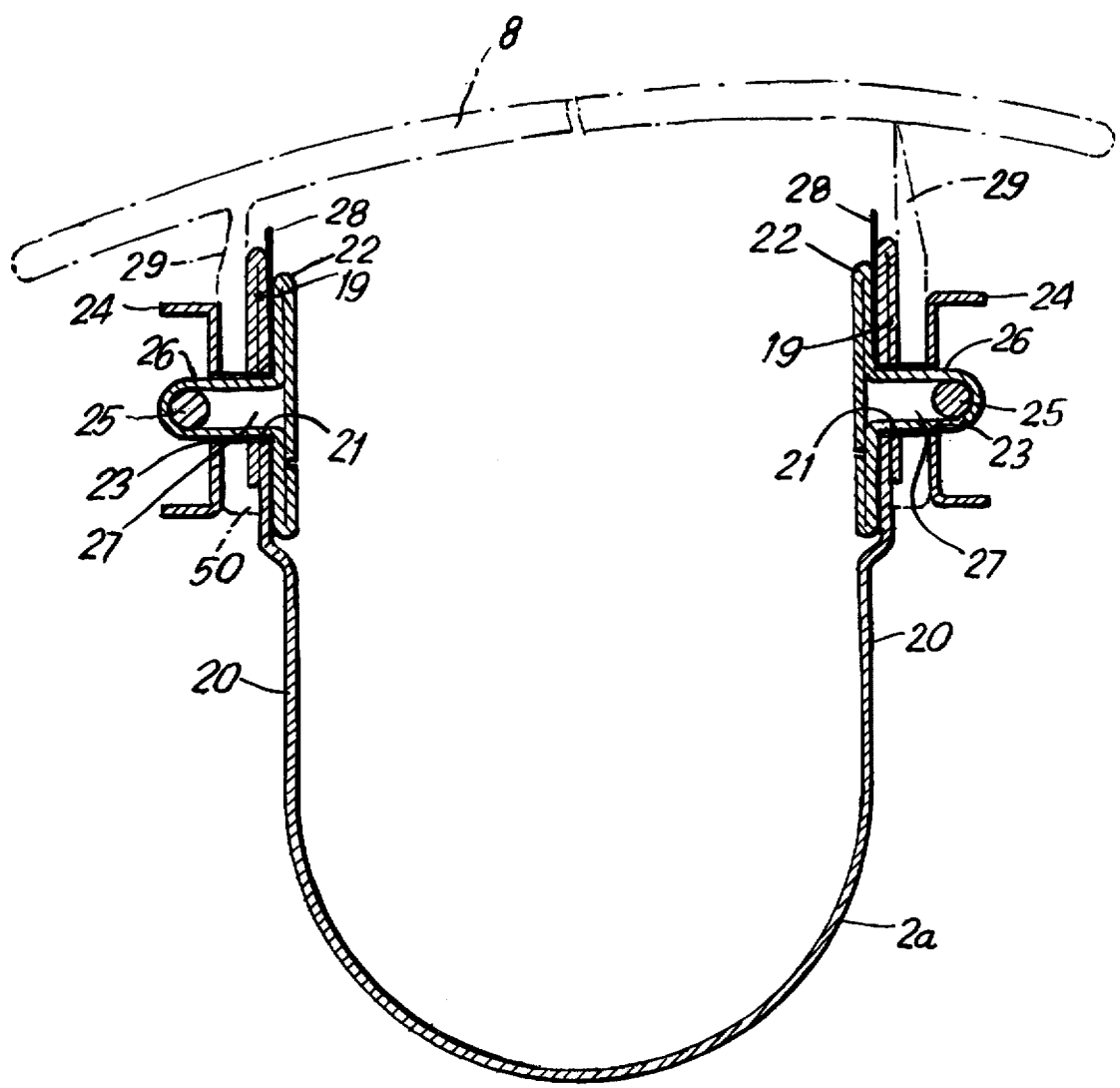
FIG. 3 a second embodiment in section

In the embodiment in FIG. 3, the body 2a again consists of a section of a prepared sheet-metal stock of essentially U-shaped cross section, whose upper margins are folded outwardly over a greater width to form a doubled margin 19. The vertical walls 20 are offset outwardly at half their height and at the doubled margins openings 21 running lengthwise

4 are provided. In this case the clamping means consist of two essentially tee-like members 22 extending on the inside over the entire length of the body 2a, plus two exterior channel-shaped members 24 also extending over the entire length of the body and provided with openings 23 corresponding to those provided in the body 2a, plus two tension anchors 25 which can be passed through the end covers 3. Portion 26 of the T-shaped stringers 22 contains a core 27 to receive the tension anchors and extends longitudinally only over the areas in which openings 21 are provided in the area of the doubled margins 19 in the body 2a. Portions of the material of the airbag 28 and/or of a lid 8 are clamped over the entire length of the body 2a between the outside channel members 24 and the body 2a. At the same time the elasticity of the clamped material sections 28, 29 and of the clamping members 22, 24 and tension anchors 25 is utilized for the purpose of producing sufficient tension in the clamping area over the entire length of the body 2a.

Figure 4:
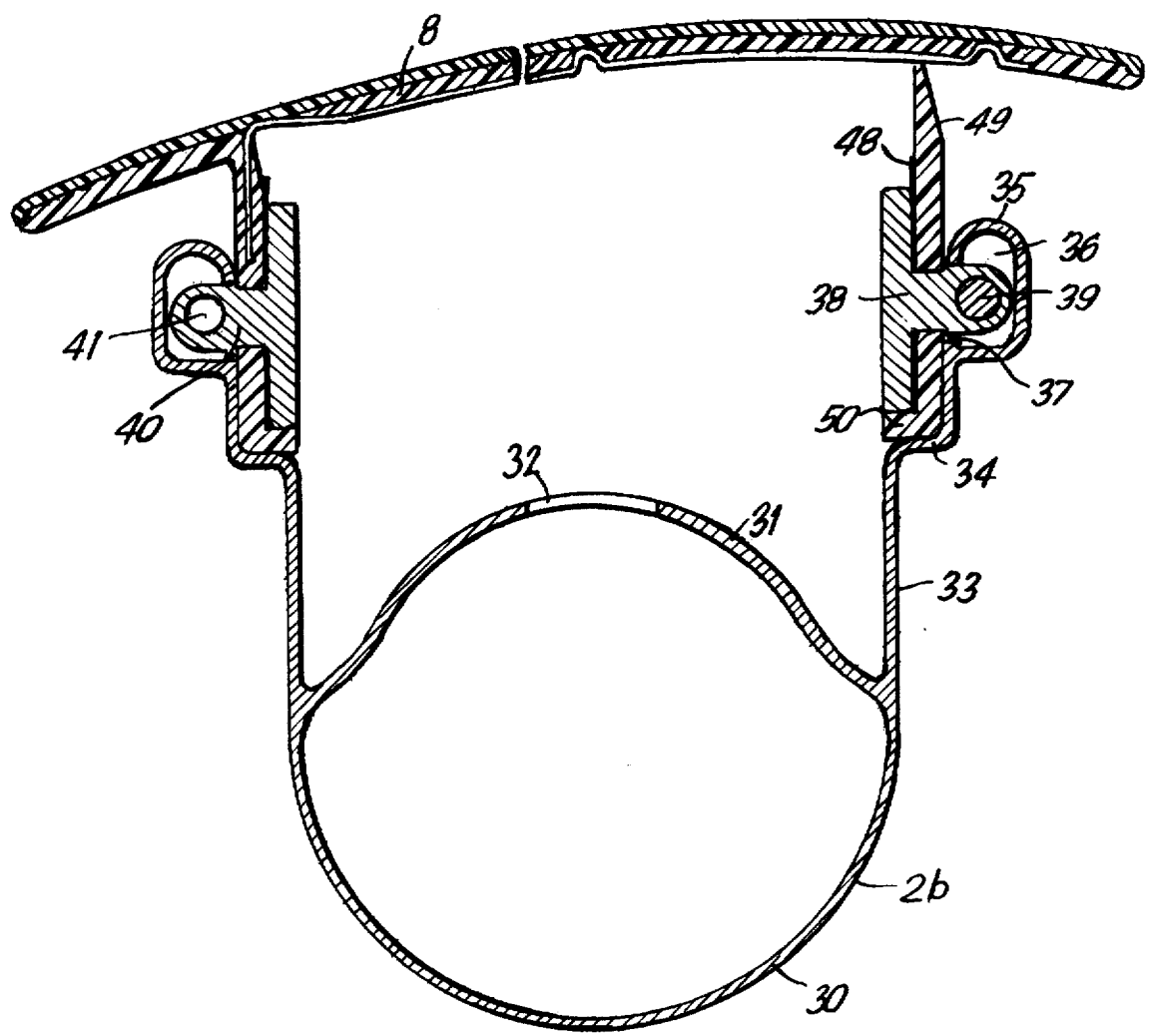
FIG. 4 a third embodiment in section

In the embodiment in FIG. 4 the body 2b consists of an extruded stock material with, again, an essentially U-shaped cross section with a semicircular bottom 30. Furthermore, there is provided a dividing wall 31 overarching the bottom and provided with openings 32. The vertical walls 33 have a step-like offset 34 at about half their height, and the ends 35 of the U-shaped cross section form outwardly closed chambers 36. Longitudinal openings 37 are made on the inner side of the latter. In this embodiment the tension means consist of two inside tee-like members 38 and two tension anchors 39, the stem part 40 of the tee 38 having a longitudinal bore 41 to receive the tension anchor 39 and extending longitudinally only over the area in which openings are provided in the wall of the ring chamber 36. Portions 48 of the material of the airbag and portions 49 of the lid 8 are clamped between the tee-like members 38 and the wall of the body 2b, while the bottom ends of the material sections 49 are hooked behind the tee-like members 38 with a portion 50.

Figure 5:
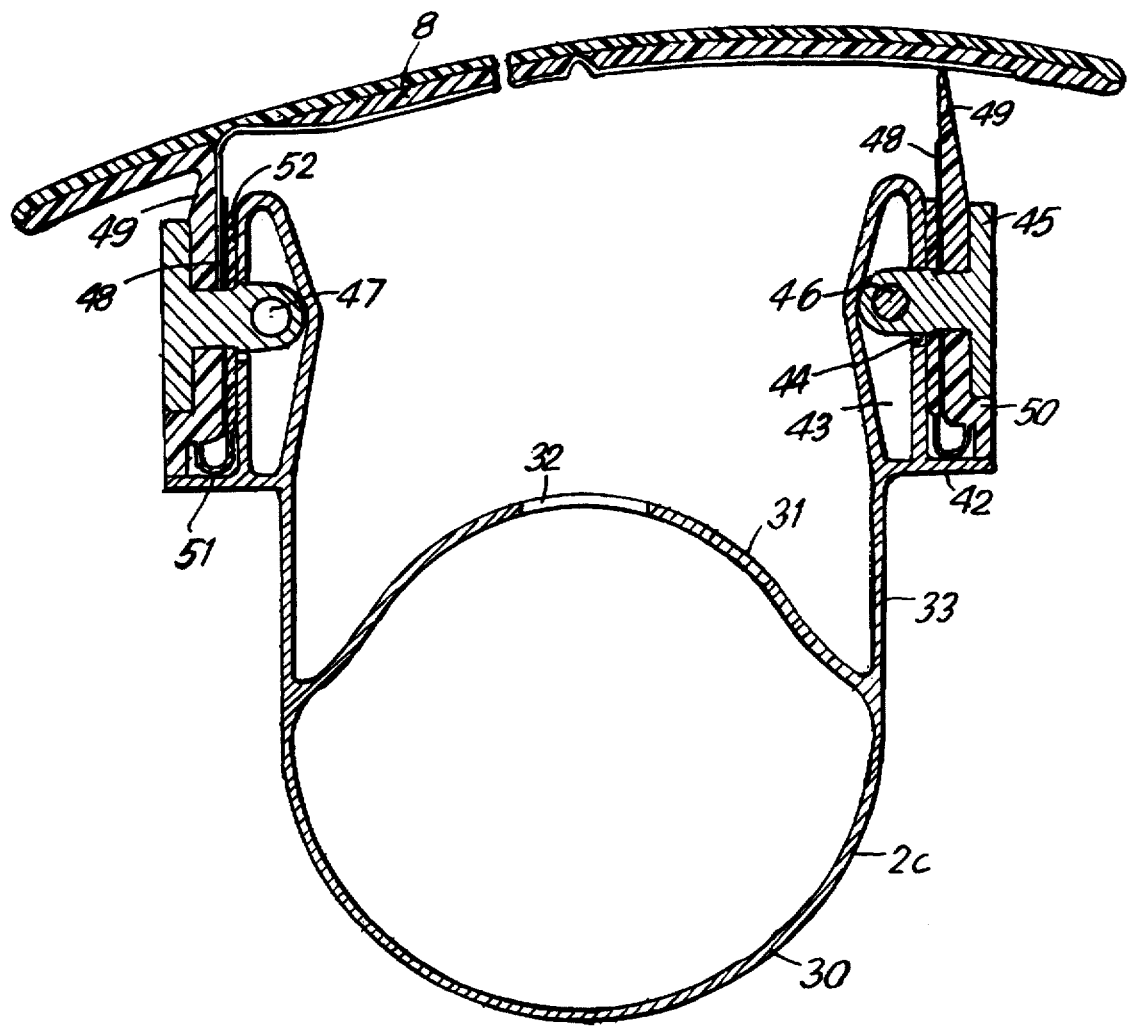
FIG. 5 a fourth embodiment in section.

The embodiment in FIG. 5 likewise consists of a section of extruded stock material, while the bottom portion of the body 2c is configured as in the embodiment shown in FIG. 4. The vertical walls 33 have at about half their height outwardly reaching sections 42, and the wall portions above these sections form closed, tube-like chambers 43 in whose outside walls slots 44 extending lengthwise are made. The tension means consist of two outside flanges 45 and two tension anchors 46, the stem portion of the flanges 45 having a longitudinal bore 47 to receive the tension anchor 46 and extending longitudinally only over the portions in which the slots 44 are provided in the wall of the annular chamber. Sections of material 48, 49 of the airbag and lid 8 are clamped together by the tension anchor between the flanges 45 and the upper part of the body 2c. The clamped section 49 of the lid 8 has at its end an outwardly offset rim 50 which can fit below the flanges 45. The section 49 of the material of the lid 8 can also be made bipartite, in which case the outside part 49 and an inside part 52 are combined integrally by a loop of material 51, and between them they clamp the section of the material 48 of the airbag when the latter is installed. In this case too the elasticity of the material is utilized to produce sufficient bias acting over the entire clamped area.

I claim:

1. A housing for a passenger protection device in a motor vehicle having an airbag and a gas generator therein and a protective covering thereon to form a ready to install module, wherein the housing comprises a body having an essentially U-shaped cross section which is uniform lengthwise along an axis, two mainly flat end covers and tension members for simultaneously fastening the airbag and the protective covering to the housing, wherein the body comprises a section cut from elongated stock material by cutting perpendicular to a longitudinal axis of the stock material, wherein the body comprises sheet-metal stock material and wherein the end covers comprises flat sheet-metal parts having the cross sectional shape of the body and margins bent over at approximately right angles to overlap the body.

2. A housing for a passenger protection device in a motor vehicle having an airbag and a gas generator therein and a protective covering thereon to form a ready to install module, wherein the housing comprises a body having an essentially U-shaped cross section which is uniform lengthwise along an axis, two mainly flat end covers and tension members for simultaneously fastening the airbag and the protective covering to the housing, wherein the body comprises a section cut from elongated stock material by cutting perpendicular to a longitudinal axis of the stock material, wherein the body comprises sheet-metal stock material, wherein the sheet-metal stock material has a U-shaped cross section with a semicircular bottom, vertical walls and upper edges folded outwardly over the vertical walls to form a material doubling portion, and wherein the vertical walls are widened outwardly stepwise to about half the height thereof and have openings extending lengthwise in the material doubling portion.

3. A housing for a passenger protection device in a motor vehicle having an airbag and a gas generator therein and a protective covering thereon to form a ready to install module, wherein the housing comprises a body having an essentially U-shaped cross section which is uniform lengthwise along an axis, two mainly flat end covers and tension members for simultaneously fastening the airbag and the protective covering to the housing, wherein the body comprises a section cut from elongated stock material by cutting perpendicular to a longitudinal axis of the stock material, wherein the body comprises extruded stock material, wherein the sheet-metal stock material has a U-shaped cross section with a semicircular bottom and vertical walls, wherein an intermediate wall is disposed in the housing semicircularly overarching the bottom and having openings, and wherein the vertical walls have a step-like offset at about half the height thereof and have upper ends forming upwardly pointing closed ring chambers forming longitudinal openings therein.

4. A housing for a passenger protection device in a motor vehicle having an airbag and a gas generator therein and a protective covering thereon to form a ready to install module, wherein the housing comprises a body having an essentially U-shaped cross section which is uniform lengthwise along an axis, two mainly flat end covers and tension members for simultaneously fastening the airbag and the protective covering to the housing and wherein the end covers have said extension members extending therethrough for fastening the module in an instrument panel or in a vehicle body.

5. The housing according to claim 4, wherein the body comprises a section cut from elongated stock material by cutting perpendicular to a longitudinal axis of the stock material.

6. The housing according to claim 4, wherein the body comprises sheet-metal stock material.

7. The housing according to claim 4, wherein the body comprises extruded stock material.

8. The housing according to claim 1, wherein the body comprises extruded stock material.

9. The housing according to claim 6, wherein the sheet-metal stock material has a U-shaped cross section with a semicircular bottom, vertical walls and upper edges rolled outwardly, wherein the vertical walls each have an inwardly pointing, semicircular indentation at a distance from the rolled upper edges and above a transition to the semicircular bottom.

10. The housing according to claim 9, wherein the indentations are dimensioned such that tension members disposed therein are approximately flush with an outside surface of the vertical walls.

11. The housing according to claim 4, wherein the end covers comprises flat sheet-metal parts having the cross sectional shape of the body and margins bent over at approximately right angles to overlap the body.

12. The housing according to claim 11, wherein the end covers have openings for the entry of the gas generator and four bores at the margins for the tension members having threads at ends thereof.

13. The housing according to claim 6, wherein the sheet-metal stock material has a U-shaped cross section with a semicircular bottom, vertical walls and upper edges folded outwardly over the vertical walls to form a material doubling portion, wherein the vertical walls are widened outwardly stepwise to about half the height thereof and have openings extending lengthwise in the material doubling portion.

14. The housing according to claim 13, wherein the tension members comprise two inwardly lying, essentially tee-like members extending over the entire length of the body, two external channels provided with openings corresponding to those in the body, and two tension anchors which extend through the end covers, wherein the tee-like members have a base portion having a longitudinal opening for receiving a tension armature and extends longitudinally over only areas in which openings are provided in the body in the doubled material portions, and the tension armature clamps material sections of one of the airbag and cover against the body.

15. The housing according to claim 14, wherein each tee-like member comprises folded sheet metal stock, and wherein the base portion of each tee-like member is a double-walled U-shape.

16. The housing according to claim 14, wherein the external channels comprise sheet-metal stock material in which openings are punched.

17. The housing according to claim 6, wherein the sheet-metal stock material has a U-shaped cross section with a semicircular bottom and vertical walls, wherein an intermediate wall is disposed in the housing semicircularly overarching the bottom and having openings, wherein the vertical walls have a step-like offset at about half the height thereof and have upper ends forming upwardly pointing closed ring chambers forming longitudinal openings therein.

18. The housing according to claim 17, wherein the tension members comprise two internal tee-like members and two tension anchors, wherein the tee-like members have a stem part having a longitudinal bore for receiving a tension armature and extending longitudinally only over the areas in which openings are provided in the wall of the ring chamber.

19. The housing according to claim 18, wherein the vertical walls have approximately at half height flanges extending outward at right angles, and wherein wall areas lying above these flanges form the closed, longitudinal ring chambers with walls openings extending longitudinally.

20. The housing according to claim 17, wherein the tension members comprise two outside tee-like members and two tension anchors, wherein the tee-like members have a stem portion having a longitudinal bore for receiving a tension armature and extending longitudinally only over the areas in which openings are provided in the wall of the ring chamber.

21. The housing according to claim 20, wherein the tension armature clamps material sections of the airbag and cover together between the tee-like members and an upper area of the body.

22. The housing according to claim 21, wherein the clamped material section of the cover has at an end one of an outwardly and inwardly pointing dog-leg for clutching one of the doubled material of the body or the tee-like members in a form-fitting manner.

23. The housing according to claim 18, wherein the tee-like members comprise an extruded stock material.

24. The housing according to claim 4, wherein the two tension members comprise four bolts with self-tapping threads.

25. The housing according to claim 23, wherein the tee-like members are integral with one of the end covers.

* * * * *